(12) United States Patent
Jones

(10) Patent No.: US 6,966,107 B2
(45) Date of Patent: Nov. 22, 2005

(54) MERGING A HEAD STACK ASSEMBLY WITH A DATA STORAGE MEDIUM

(75) Inventor: Jonathan P. Jones, Piedmont, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 416 days.

(21) Appl. No.: 10/180,468

(22) Filed: Jun. 26, 2002

(65) Prior Publication Data

US 2003/0159273 A1   Aug. 28, 2003

Related U.S. Application Data

(60) Provisional application No. 60/360,389, filed on Feb. 28, 2002.

(51) Int. Cl.[7] ............................................. G11B 5/127
(52) U.S. Cl. ....................... 29/603.03; 29/737; 29/759; 360/980.1; 360/254.3
(58) Field of Search ............................... 29/603.3, 737, 29/759, 760, 603.03; 360/254.3, 254.6–254.8, 360/255.3, 98.01; 700/214, 218

(56) References Cited

U.S. PATENT DOCUMENTS

| 5,150,512 | A | | 9/1992 | Hatchett et al. |
| 5,347,414 | A | * | 9/1994 | Kano ...................... 360/254.4 |
| 5,540,542 | A | | 7/1996 | Krajec et al. |
| 5,692,289 | A | | 12/1997 | Amada et al. |
| 5,826,325 | A | * | 10/1998 | Price et al. ............... 29/603.03 |
| 5,984,104 | A | * | 11/1999 | Schott et al. ................ 206/728 |
| 5,987,735 | A | | 11/1999 | Horning et al. |
| 6,049,969 | A | | 4/2000 | Jenkins et al. |
| 6,094,804 | A | | 8/2000 | Chuang et al. |
| 6,105,240 | A | | 8/2000 | Chuang et al. |
| 6,163,439 | A | | 12/2000 | Jeong |
| 6,212,759 | B1 | | 4/2001 | Liu et al. |
| 6,295,717 | B1 | | 10/2001 | Chuang et al. |
| 6,577,473 | B1 | * | 6/2003 | Macpherson et al. .... 360/254.7 |

* cited by examiner

*Primary Examiner*—Minh Trinh
*Assistant Examiner*—Donghai D. Nguyen
(74) *Attorney, Agent, or Firm*—Fellers, Snider, et al.

(57) ABSTRACT

Apparatus for merging a disc drive head disc assembly (HSA) with a disc stack. The HSA comprises a flexure which supports a data transducing head and the disc stack comprises a disc having a data storage surface. A merge assembly includes a shipping comb attached to the HSA, the shipping comb having a first alignment member and a first flexure support member. The merge assembly further includes a merge comb having a second alignment member and a second flexure support member. The merge comb is advanced by a robotic arm to a position where the second alignment member engages the first alignment member. This aligns the shipping comb with the merge comb and allows transfer of support of the flexure to the second flexure support member at an elevation suitable to subsequently pass the head in a safe, clearing relationship over the data storage surface.

6 Claims, 5 Drawing Sheets

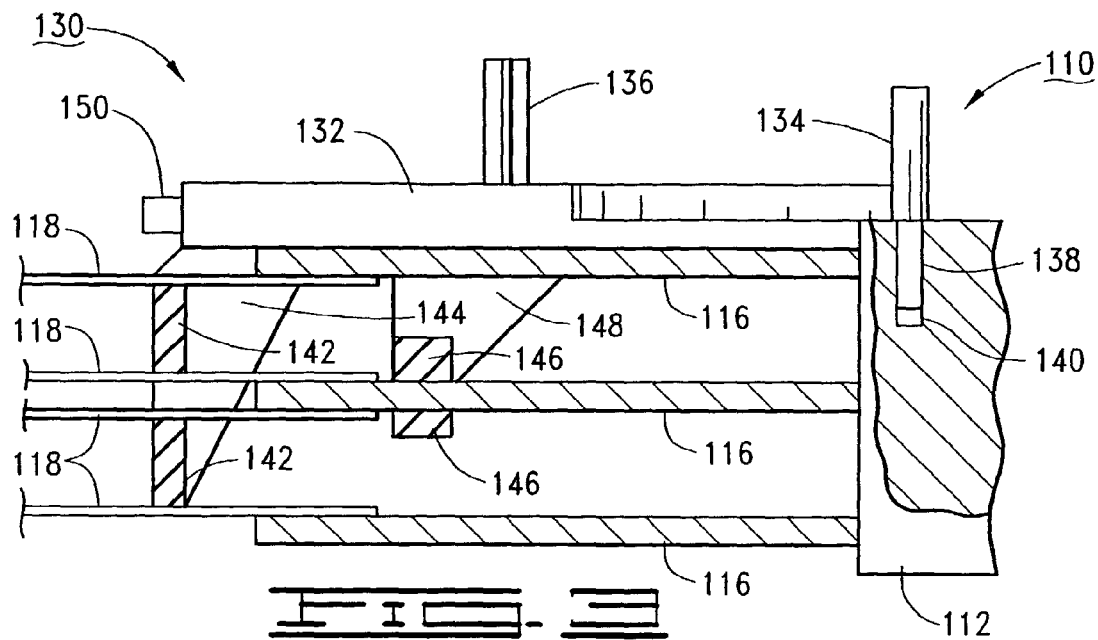
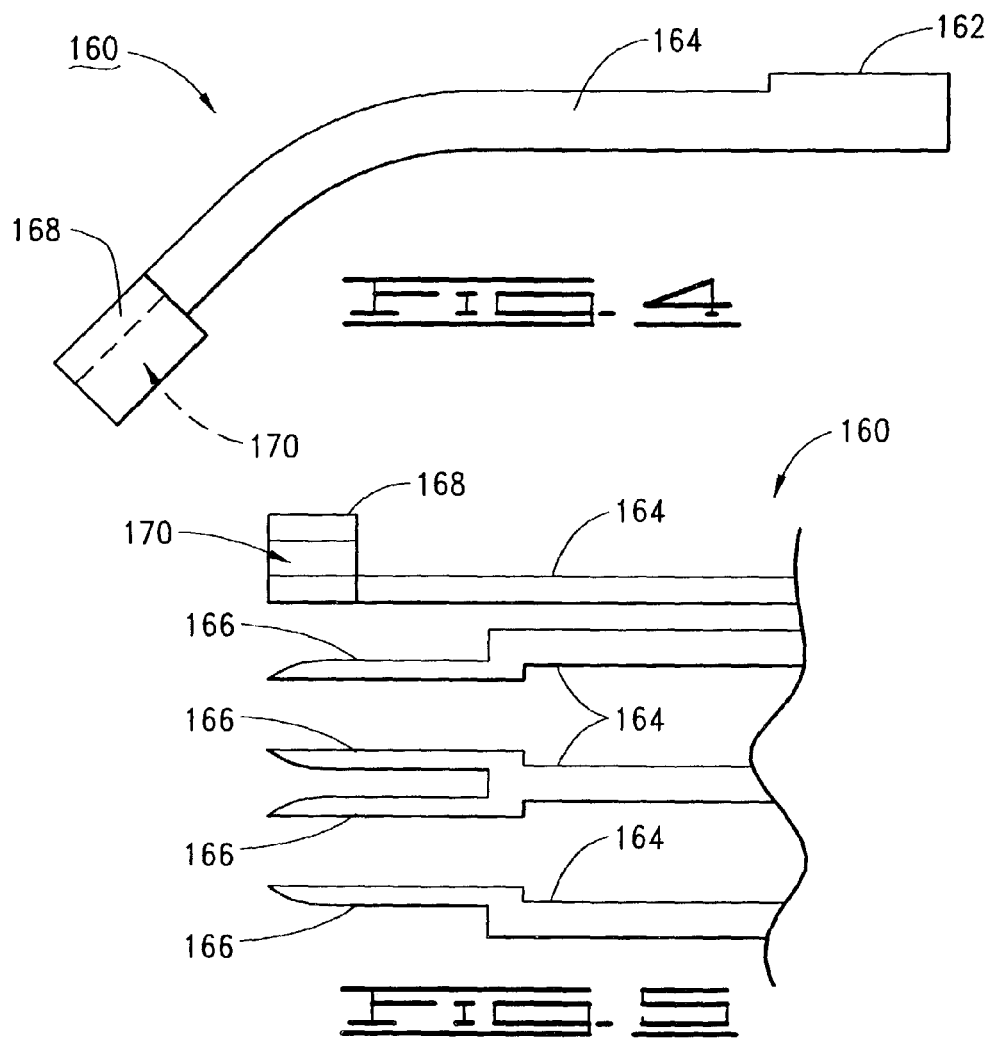

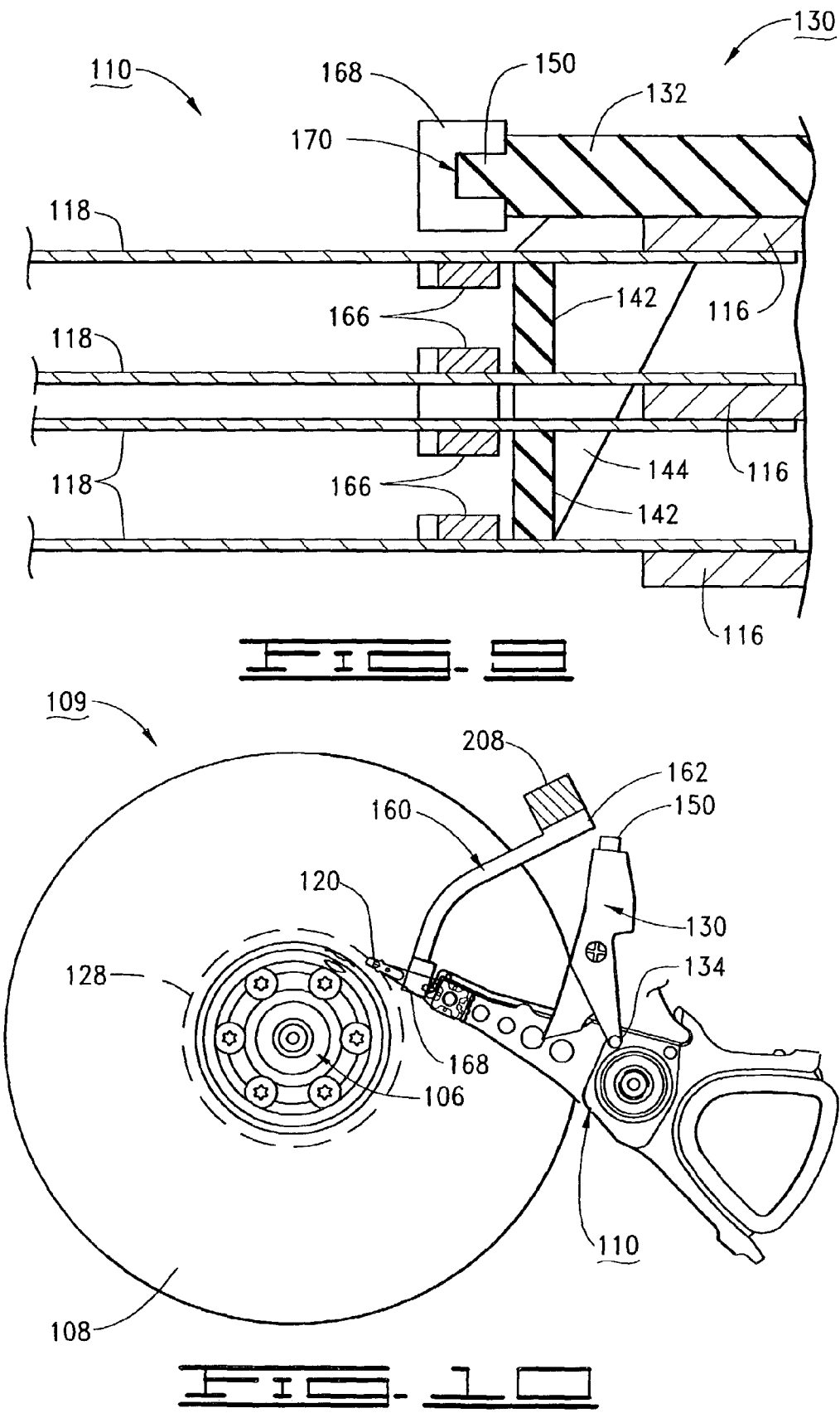

MERGING A HEAD STACK ASSEMBLY WITH A DATA STORAGE MEDIUM

RELATED APPLICATIONS

This application claims priority to U.S. Provisional Application No. 60/360,389 entitled MERGE SPREADER SHIPPING COMB GUIDE filed Feb. 28, 2002.

FIELD OF THE INVENTION

The claimed invention relates generally to disc drive data storage devices and more particularly to the merging of heads and discs during disc drive device manufacturing.

BACKGROUND

Disc drives are digital data storage devices which store and retrieve large amounts of user data in a fast and efficient manner. The data are magnetically recorded on the surfaces of one or more rigid data storage discs affixed to a spindle motor for rotation at a constant high speed. The discs and spindle motor are commonly referred to as a disc stack.

The disc stack is accessed by an array of vertically aligned data transducing heads which are controllably positioned by an actuator assembly. Each head typically includes electromagnetic transducer read and write elements which are carried on an air bearing slider. The slider acts in a cooperative hydrodynamic relationship with a thin layer of air dragged along by the spinning discs to fly each head in a closely spaced relationship to the disc surface.

In order to maintain the proper flying relationship between the heads and the discs, the heads are attached to and supported by flexible suspension assemblies (flexures). An actuator motor (typically a voice coil motor, VCM) rotates the actuator assembly to cause the heads to move across the disc recording surfaces. The actuator assembly is also referred to as a head stack assembly (HSA). Both the disc stack and the HSA are mounted to and supported by a rigid base deck of the drive.

Disc drives of the present generation are typically manufactured using high volume automated assembly lines. In a typical automated line, each drive is assembled on a pallet that is conveyed to various assembly stations, with each station adding a different set of components to or performing a different operation upon the drive.

One such station is commonly referred to as a head-disc merge station in which an HSA is merged with a disc stack. The term "merge" in this context refers to the insertion and positioning of the heads into the disc stack (i.e., the positioning of the heads between and adjacent to the discs) in the final desired operational relationship.

In some merge operations the HSA and the disc stack are merged and then the merged HSA and disc stack are concurrently mounted to the base deck. Other merge operations mount the disc stack to the base deck, mount the HSA onto the base deck with the heads at a position outside the outermost diameter of the disc stack, and then rotate the HSA to merge the heads into the disc stack.

Typically, at the conclusion of a merge operation the heads are positioned near an innermost diameter of the disc stack and come to rest against texturized landing zones defined on the disc surfaces. The landing zones provide reduced stiction forces between the heads and discs and thus allow the heads to safely park during non-operation of the drive.

A latching arrangement secures the HSA when the heads are parked to prevent the heads from inadvertently moving out onto the data recording surfaces in response to application of a mechanical shock to the drive, since allowing the heads to come into contact with the data recording surfaces when the discs are not rotating can result in damage to the drive.

It is thus generally necessary to support the heads above the respective disc surfaces during the merge operation to place the heads in the final desired parked position. While prior art techniques have been proposed to apply power to the spindle motor to rotate the discs and to apply power to the actuator motor so that the heads are supported by air bearings established by disc rotation during the merge operation, it is generally more common to perform the merge operation while the discs are stationary (nonrotating) and to use appropriate tooling to support and advance the heads to the parked position.

The HSAs are typically sourced by an HSA manufacturer and are provided with removable shipping combs, which are comb-like structures that individually support the flexures to protect the heads from being jostled against one another and to prevent deformation of the flexures during shipping and handling.

During a typical merge operation, a merge comb (also merge tool, merge spreader) is inserted into the HSA by the merge station to provide the appropriate spacing between the heads. Once the heads are supported by the merge comb, the shipping comb is removed and the merge comb advances the heads to the final parked position.

Preferably, the merge comb supports the flexures and the heads as the heads are moved from the outermost diameter of the discs to the innermost diameter of the discs in such a manner so that no contact occurs between the disc stack and either the merge comb or HSA until the merge comb releases the heads in the final parked position. Once the heads are parked, the merge comb is retracted and the process is completed.

While the use of prior art merge combs during the merge process has been found to be effective, yield losses have nevertheless been observed partially due to misalignment of the HSA and/or the shipping comb with the merge comb. A primary failure mode has been linked to the merge comb not contacting and supporting the flexures in the appropriate location, leading to damage of the HSA and/or the discs due to mechanical interference between the discs and the HSA.

There is therefore a continued need for improvements in the art to address these and other limitations associated with the prior art, and it is to such improvements that the claimed invention is addressed.

SUMMARY OF THE INVENTION

In accordance with preferred embodiments, an apparatus and method are provided to merge a head-stack assembly (HSA) with a disc stack in a disc drive data storage device. The HSA comprises at least one flexure which supports a data transducing head and the disc stack comprises at least one disc having a data storage surface.

The apparatus of the claimed invention is generally directed to a merge assembly comprising a shipping comb attached to the HSA. The shipping comb comprises a first alignment member and a first flexure support member, the first flexure support member initially supporting the flexure at a first elevation.

The merge assembly further comprises a merge comb comprising a second alignment member and a second flexure support member. The second alignment member engages the first alignment member to adjust an elevation of the shipping comb to facilitate a transfer of support of the flexure to the second flexure support member at a second elevation sufficient to establish a clearing relationship between the head and the disc as the head is moved adjacent the data storage surface.

Preferably, a selected one of the first and second alignment members comprises an alignment tab and the remaining one of the first and second alignment members comprises an alignment channel sized to accommodate the alignment tab.

The merge comb preferably further comprises a main body portion configured for attachment to a robotic arm and first and second support arms which extend from the main body portion, the first support arm supporting the second alignment member and the second support arm supporting the second flexure support member.

The shipping comb further preferably comprises an alignment peg which extends into a tooling aperture of the HSA, wherein the shipping comb is configured to contact an edge surface of the disc stack so that the HSA rotates with respect to the alignment peg while the second flexure support member advances the head across the data storage surface.

The merge comb is further preferably configured to place the head upon a texturized landing zone located adjacent an innermost diameter of the data storage surface and thereafter retract to a position beyond an outermost diameter of the data storage surface.

The method of the claimed invention is generally directed to steps including affixing to the HSA a shipping comb comprising a first alignment member and a first flexure support member, the first flexure support member initially supporting the flexure.

The method further preferably includes advancing a merge comb to a position adjacent the HSA and the shipping comb, the merge comb comprising a second alignment member and a second flexure support member, and then engaging the first and second alignment members to align the shipping comb with the merge comb and transfer support of the flexure from the first flexure support member to the second flexure support member.

The method further preferably comprises subsequently advancing the merge comb across the data storage surface with the second flexure support member maintaining the head and the flexure in a clearing relationship with the disc.

Alignment of the shipping comb with the merge comb in this way averts damage to the HSA and the discs, first by ensuring the flex support members of the merge comb properly engage the flexures, and second by ensuring that the flex support members of the merge comb insert the heads and flexures in a clearing relationship to the discs as the heads are moved to the final desired parked position.

These and various other features and advantages which characterize the claimed invention will become apparent upon reading the following detailed description and upon reviewing the associated drawings.

BRIEF DESCRIPTION OF THE DRAWINGS

FIG. 3 provides an elevational, partial cross-sectional view of the HSA and the shipping comb of FIG. 2.

FIG. 4 provides a top plan view of a merge comb (merge tool, merge spreader) used to merge the HSA with the disc stack of the disc drive of FIG. 1 in accordance with preferred embodiments.

FIG. 6 provides a flow chart for a HEAD-DISC MERGE OPERATION, generally illustrative of steps carried out in accordance with preferred embodiments of the present invention.

FIGS. 7–10 show the disc stack and HSA at various stages of the flow chart of FIG. 6.

DETAILED DESCRIPTION

Figure 1:
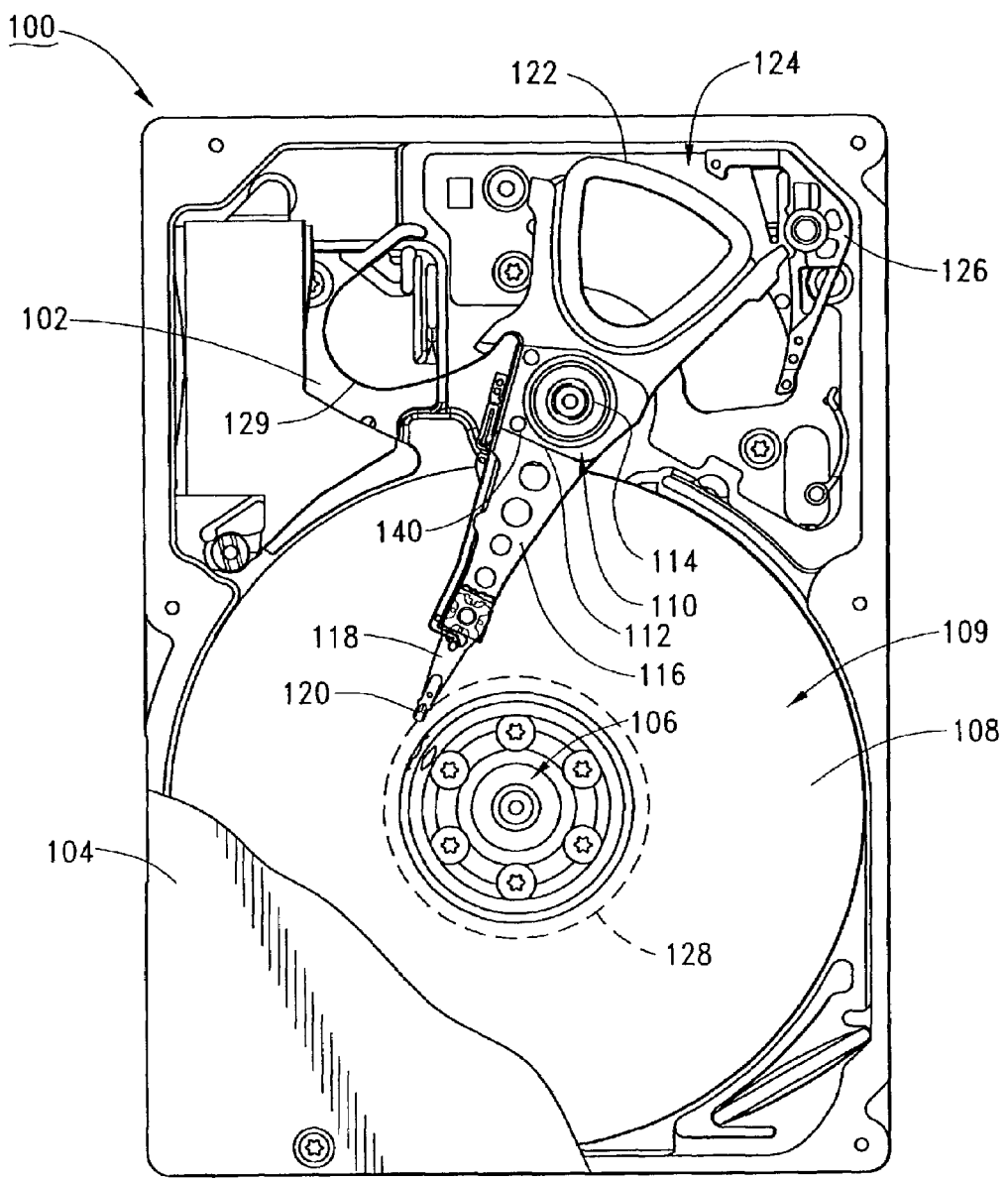
FIG. 1 is a top plan view of a disc drive constructed in accordance with preferred embodiments of the present invention.

FIG. 1 provides a top plan view of a disc drive 100 constructed in accordance with preferred embodiments of the present invention. A base deck 102 and a top cover 104 (shown in partial cutaway) cooperate to form a sealed housing for the disc drive 100.

A spindle motor 106 supported by the base deck 102 rotates a number of magnetic recording discs 108 at a constant, high speed. The discs 108 are stacked on a rotatable hub of the spindle motor 106 in a conventional fashion using suitable spacers and clamping elements (not separately designated). The spindle motor 106, discs 108, spacers and clamping elements collectively form a disc stack 109.

An actuator assembly 110 (head stack assembly, HSA) includes a central body 112 configured to rotate about a cartridge bearing assembly 114 affixed to the base deck 102. A number of rigid actuator arms 116 extend from the central body 112 into the disc stack 109. Flexible suspension assemblies (flexures) 118 extend from the arms 112 to support an array of data transducing heads 120.

While any number of discs and heads can be used, it is contemplated for purposes of the present discussion that the disc drive 100 includes two discs 108 and four heads 120. The four heads 120 are supported by three actuator arms 116. A top actuator arm 116 extends above the disc stack 109 (as shown in FIG. 1), a bottom actuator arm 116 extends below the disc stack 109, and an intermediary actuator arm 116 extends between the two discs 108 (the intermediary actuator arm 116 supports two flexures 118 and two heads 120).

The HSA 110 is pivotally moved through the application of current to a coil 122 of a voice coil motor (VCM) 124. When in a non-operational state (as shown in FIG. 1), the HSA 10 is latched in a parked position by a toggle latch 126 and the heads 120 contactingly abut texturized landing zones (denoted by broken line 128) defined on the disc surfaces near the innermost diameters of the discs 108.

A flex circuit assembly 129 passes electrical signals between the HSA 110 and a disc drive printed circuit board (PCB) housing communication and control electronics for the disc drive 100. The PCB is mounted to the underside of the base deck 102 and is hence not visible in FIG. 1.

Figure 2:
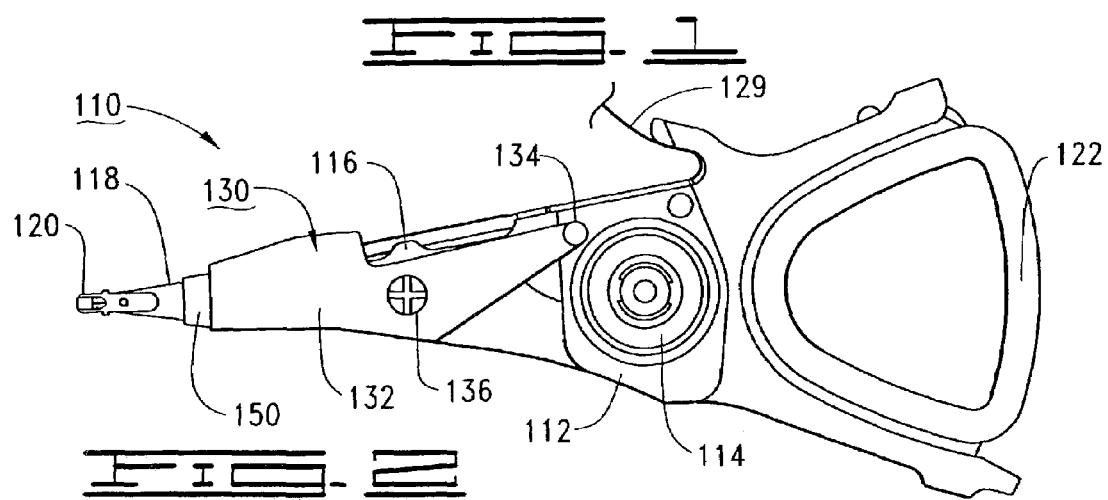
FIG. 2 provides a top plan view of the actuator assembly (head disc assembly, HSA) of FIG. 1 in conjunction with a shipping comb used to protect the HSA during shipping and handling prior to installation into the disc drive.

FIG. 2 shows the HSA 110 of FIG. 1 prior to installation onto the base deck 102. The HSA 10 is provided with a shipping comb 130 which is used to protect the HSA 110 from damage during shipping and handling. As shown in FIG. 3, the shipping comb 130 includes a main body portion 132 which extends along and is supported by the top surface of the top actuator arm 116.

First and second alignment posts 134, 136 extend upwardly from the main body portion 132 as shown for manipulation of the shipping comb 130. An alignment peg 138 extends downwardly from the first alignment post 134 into a tooling aperture 140 in the central body 112 of the HSA 110.

The shipping comb 130 further includes spacer members 142 (shown in cross-section for ease of identification) which extend between adjacent pairs of the flexures 118 to support the flexures in a desired spaced relationship. The spacer members 142 are supported by a spacer support arm 144 which extends downwardly from the main body portion 132.

Actuator arm clip members 146 (also shown in cross-section) pressingly engage the intermediary actuator arm 116 as shown and are supported by a clip support arm 148. A shipping comb alignment tab 150 projects from a distal end of the main body portion 132 and is used during the merging of the HSA 110 with the disc stack 109 as explained below.

Figure 5:
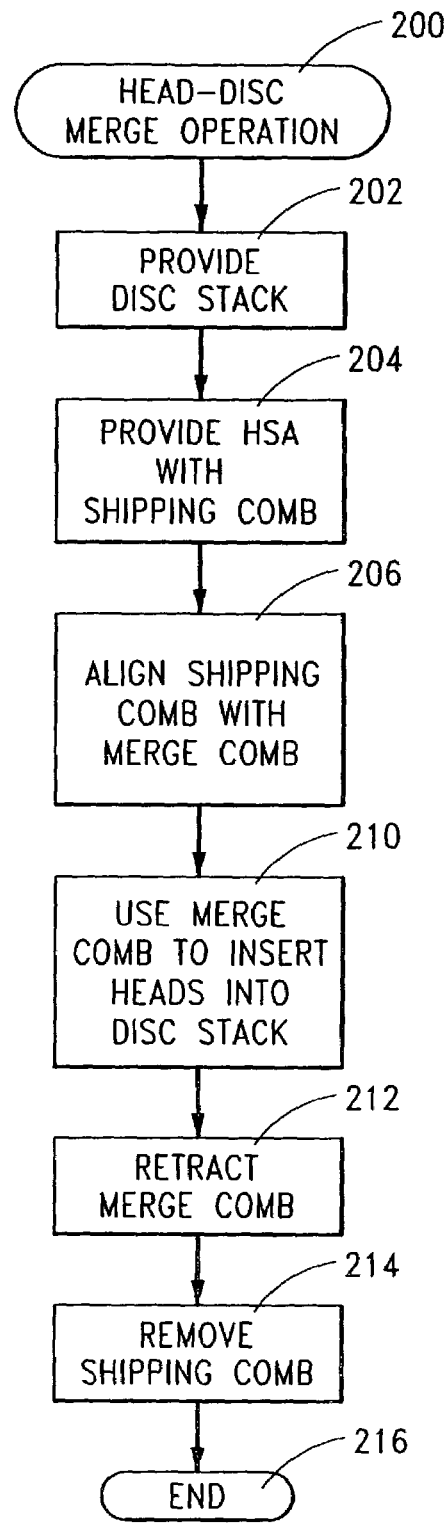
FIG. 5 provides a partial elevational view of the merge comb of FIG. 4.

A merge comb 160 is shown in FIGS. 4 and 5. The merge comb 160 (also referred to as a merge tool and a merge spreader) is preferably manipulated by a robotic arm (not shown) to merge the HSA 110 with the disc stack 109.

The merge comb 160 includes a main body portion 162 and a number of rigid merge arms 164 which extend from the main body portion 162. As shown in FIG. 5, it is contemplated for the present discussion that the merge comb 160 includes a total of four merge arms 164, although other configurations are readily envisioned depending upon the requirements of a given application.

The lower three merge arms 164 support four flexure support members 166 as shown. The topmost merge arm 164 supports an alignment body portion 168 that defines a u-shaped channel 170 sized to accommodate the shipping comb alignment tab 150 (FIG. 3).

The alignment tab 150 and channel 170 are preferably respectively configured with appropriate beveled edges to allow precise alignment and passage of the alignment tab 150 into and through the channel 170 during the merge operation. The shipping comb 130 and the merge comb 160 are collectively referred to herein as a merge assembly.

FIG. 6 provides a flow chart for a HEAD-DISC MERGE OPERATION 200 carried out in accordance with preferred embodiments of the present invention. Initially, a disc stack (such as the disc stack 109) is provided at step 202 and an HSA (such as the HSA 110) with a shipping comb (such as the shipping comb 130) are provided at step 204.

Figure 7:
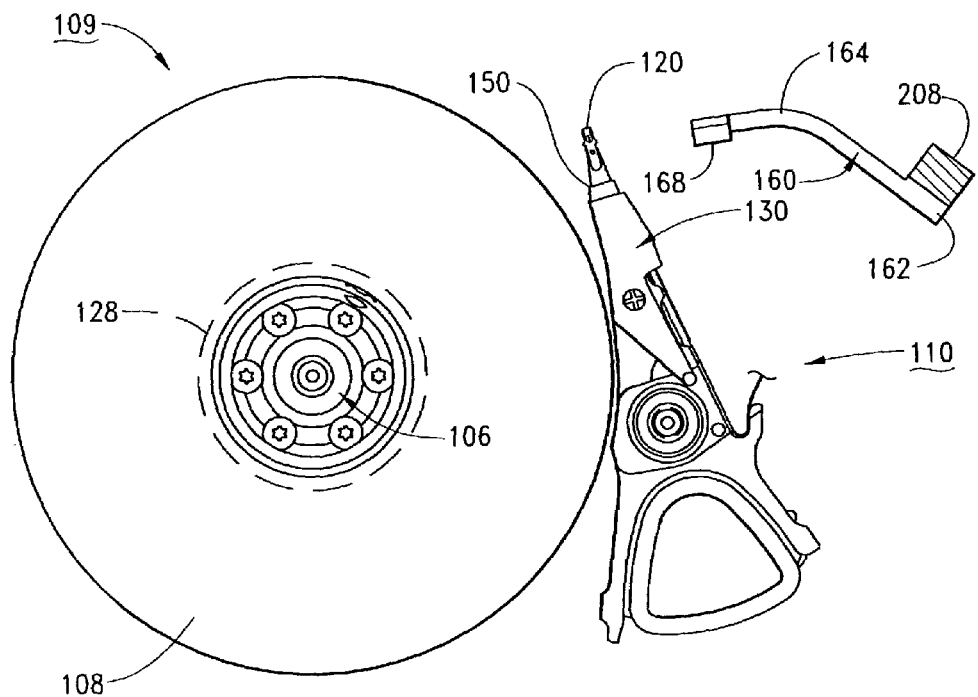

The disc stack 109 and the HSA 110 will generally have a respective orientation at this point as shown in FIG. 7, with the heads 120 at a position beyond the outermost diameter of the disc stack 109. The disc stack 109 and the HSA 110 are also preferably mounted to the base deck 102 at this time. However, such is not limiting since the merge operation can alternatively be carried out prior to attachment of the HSA 110 and the disc stack 109 to the base deck 102.

Figure 8:
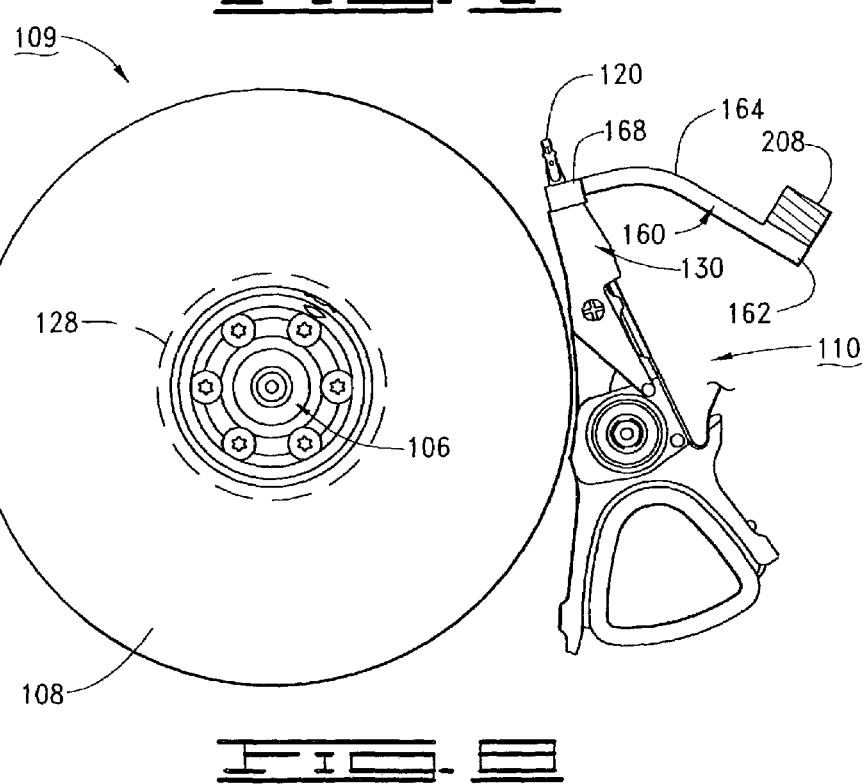

Continuing with the flow of FIG. 6, at step 206 a merge comb (such as the merge comb 160) is advanced to align with the HSA 110 and the shipping comb 130, as shown in FIG. 8. The merge comb 160 is preferably advanced by a downwardly extending robotic arm 208 (shown in partial cross-section) affixed to the main body 162 of the merge comb 160.

The alignment of the HSA 110 and the shipping comb 130 with the merge comb 160 during step 206 results in the insertion of the shipping comb alignment tab 150 into the merge comb alignment channel 170, and the placement of the flexure support members 142 into respective positions to support the flexures 118 as illustrated by FIG. 9.

The elevation of the merge comb 160 is preferably controlled with respect to the measured elevation of the disc stack 109 so that, as the shipping comb alignment tab 150 is passed into the merge comb alignment channel 170, the elevational orientation of the shipping comb 130 is adjusted to place the flexures 118 in an appropriate alignment with the flex support members 166 and with the discs 108.

In this way, damage is averted in at least two primary ways. First, the flexures 118 are brought into an appropriate alignment to receive abutting support by the flex support members 166. Those skilled in the art will recognize that flexures are typically made of spring steel and can readily be deformed beyond the elastic limit of the material should the distal ends of the flex support members 166 catch (mechanically interfere) with the edges of the flexures. Even worse, potentially severe damage can occur if the flex support members 166 fail to pass on the intended sides of the respective flexures 118.

Another way in which damage is averted is the fact that, once the flex support members 166 correctly align and support the flexures 118, subsequent advancement of the merge comb 160 into the disc stack 109 will occur without undesired contact between the heads 120 and the discs 108. It is contemplated that the material and dimensions of the merge comb 160 will be selected to ensure that alignment of the channel 170 with the alignment tab 150 results in the maintenance of the precise desired relative alignment of the flex support members 166.

Continuing with the flow of FIG. 6, the merge comb 160 is next used to advance the heads 120 to the desired final parked position, as shown in FIG. 10. As the merge comb 160 is advanced beyond the orientation shown in FIGS. 8 and 9, it will be noted that the shipping comb 130 will mechanically interfere with the discs 108; more particularly, with reference again to FIG. 3, the flexure support members 142 will contactingly abut the outer diameters of the two discs 108, preventing further movement of the shipping comb 130 with respect to the HSA 110.

Accordingly, the clip members 146 will disengage from the intermediary actuator arm 116, the flexure support members 142 will disengage from the flexures 118, and the alignment tab 150 will pass through the other side of the channel 170. Since the alignment peg 138 (see FIG. 3) remains within the tooling aperture 140, the shipping comb 130 will remain fixed in place while the HSA 110 pivots to the parked position (as shown in FIG. 10).

When the merge operation takes place with the components mounted to the base deck 102, the latch 126 secures the HSA 110 in the parked position, allowing the merge comb 160 to be retracted at step 212 of FIG. 6. Alternatively, when the merge operation takes place outside the base deck 102 the HSA 110 is fixed using another suitable mechanical arrangement.

As the flex support members 166 pull away from the flexures 118, the spring forces imparted by the flexures 118 will bring the heads 120 into pressing abutment onto the landing zones 128. The shipping comb 130 is then removed from the HSA 110 at step 214 and the routine ends at step 216.

In summary, it will now be understood that the present invention (as embodied herein and as claimed below) is generally directed to an apparatus and method for merging a head-stack assembly (HSA) with a disc stack in a disc drive data storage device. In accordance with preferred embodiments, the HSA (such as 110) comprises a flexure (such as 118) which supports a data transducing head (such as 120) and the disc stack (such as 109) comprises a disc (such as 108) having a data storage surface.

The apparatus of the claimed invention is generally directed to a merge assembly comprising a shipping comb (such as 130) attached to the HSA and comprising a first alignment member (such as 150) and a first flexure support member (such as 142), the first flexure support member initially supporting the flexure at a first elevation (such as shown in FIG. 3).

The merge assembly further comprises a merge comb (such as 160) comprising a second alignment member (such as 170) and a second flexure support member (such as 166).

The second alignment member engages the first alignment member to adjust an elevation of the shipping comb to facilitate a transfer of support of the flexure to the second flexure support member at a second elevation sufficient to establish a clearing relationship between the head and the disc as the head is moved adjacent the data storage surface (as shown in FIG. 9).

Preferably, a selected one of the first and second alignment members comprises an alignment tab and wherein the remaining one of the first and second alignment members comprises an alignment channel sized to accommodate the alignment tab.

The merge comb preferably further comprises a main body portion (such as 162) configured for attachment to a robotic arm (such as 208) and first and second support arms (such as 164) which extend from the main body portion, the first support arm supporting the second alignment member and the second support arm supporting the second flexure support member.

The shipping comb further comprises an alignment peg (such as 138) which extends into a tooling aperture (such as 140) of the HSA, wherein the shipping comb is configured to contact an edge surface of the disc so that the HSA rotates with respect to the alignment peg while the second flexure support member advances the head across the data storage surface (such as shown in FIG. 10).

The merge comb is further preferably configured to place the head upon a texturized landing zone (such as 128) located adjacent an innermost diameter of the data storage surface and thereafter retract to a position beyond an outermost diameter of the data storage surface.

The method of the claimed invention is generally directed to steps including affixing to the HSA a shipping comb comprising a first alignment member and a first flexure support member, the first flexure support member initially supporting the flexure (such as by step 204 of FIG. 6).

The method further preferably includes advancing a merge comb to a position adjacent the HSA and the shipping comb, the merge comb comprising a second alignment member and a second flexure support member, and then engaging the first and second alignment members to align the shipping comb with the merge comb and transfer support of the flexure from the first flexure support member to the second flexure support member (such as by step 206 of FIG. 6).

The method further preferably comprises subsequently advancing the merge comb across the data storage surface with the second flexure Support member maintaining the head and the flexure in a clearing relationship with the disc (such as by step 210 of FIG. 6).

For purposes of the appended claims, the recited function of the first means will be understood as being carried out by the disclosed alignment tab 150 of the shipping comb 130 and the alignment channel 170 of the merge comb 160.

Although the disc stack 109 embodied herein comprises two discs 108, for purposes of the appended claims it will be expressly understood that the recited disc stack can include any number of discs including more than two discs or just a single disc.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the merge assembly without departing from the spirit and scope of the present invention.

In addition, although the embodiments described herein are directed to an merge assembly for a disc drive, it will be appreciated by those skilled in the art that the merge assembly can be used for other devices without departing from the spirit and scope of the claimed invention.

What is claimed is:

1. An apparatus comprising in combination a merge comb and a shipping comb adapted to merge a head stack assembly (HSA) with a data storage medium, wherein the shipping comb comprises a first alignment member and a first flexure support member supportingly engaging a flexure of the HSA, the merge comb comprising a second alignment member and a second flexure support member, the merge comb being moveable for engaging the alignment members together to align the shipping comb with the merge comb while simultaneously engaging both flexure support members in full supporting engagement of the flexure before withdrawing the first flexure support member to transfer supporting engagement of the flexure from the first flexure support member to the second flexure support member.

2. The apparatus of claim 1, wherein a selected one of the first and second alignment members comprises an alignment tab and wherein the remaining one of the first and second alignment members comprises an alignment channel sized to accommodate the alignment tab.

3. The apparatus of claim 1, wherein the merge comb further comprises a main body portion and first and second support arms which extend from the main body portion, the first support arm supporting the second alignment member and the second support arm supporting the second flexure support member.

4. The apparatus of claim 1, wherein the second alignment member is configured to subsequently disengage from the first alignment member as the second flexure support member advances the HSA across a data storage surface of the medium.

5. The apparatus of claim 4, wherein the shipping comb further comprises an alignment peg which extends into a tooling aperture of the HSA, wherein the shipping comb is configured to contact an edge surface of the medium so that the HSA rotates with respect to the alignment peg while the second flexure support member advances the HSA across the data storage surface.

6. The apparatus of claim 4, wherein the merge comb is configured to place a head supported by the flexure upon a texturized landing zone located adjacent an innermost diameter of the data storage surface and thereafter retract to a position beyond an outermost diameter of the data storage surface.

* * * * *